(12) United States Patent
Van Krevelen et al.

(10) Patent No.: US 6,230,229 B1
(45) Date of Patent: May 8, 2001

(54) METHOD AND SYSTEM FOR ARBITRATING PATH CONTENTION IN A CROSSBAR INTERCONNECT NETWORK

(75) Inventors: Christopher J. Van Krevelen, Coon Rapids; Reed S. Nelson, Shoreview; Don J. Hodapp, Jr., Maple Grove; John D. Hamre, Plymouth, all of MN (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 08/994,527

(22) Filed: Dec. 19, 1997

(51) Int. Cl.[7] ................................................. G06F 13/00
(52) U.S. Cl. ....................... 710/131; 710/132; 710/129; 710/241; 710/113; 710/38; 710/39; 710/107
(58) Field of Search ................................. 395/306–312, 395/282–283, 284–285, 287–298, 840–848, 856–861; 710/240–244

(56) References Cited

U.S. PATENT DOCUMENTS

| | | | |
|---|---|---|---|
| 4,897,833 | * 1/1990 | Kent et al. | 370/85.2 |
| 4,985,830 | * 1/1991 | Atac et al. | 710/131 |
| 5,307,466 | 4/1994 | Chang . | |
| 5,463,486 | 10/1995 | Stevens . | |
| 5,533,201 | * 7/1996 | Benton et al. | 710/131 |
| 5,577,204 | * 11/1996 | Brewer et al. | 395/200.01 |
| 5,623,698 | 4/1997 | Stephenson et al. . | |
| 5,657,449 | * 8/1997 | Osaki | 370/357 |
| 5,682,485 | * 10/1997 | Farmer et al. | 710/131 |
| 5,689,644 | * 11/1997 | Chou et al. | 709/227 |
| 5,699,533 | * 12/1997 | Sakai | 710/131 |
| 5,745,709 | * 4/1998 | Okabayashi et al. | 395/311 |
| 5,751,710 | * 5/1998 | Crowther et al. | 370/423 |
| 5,796,966 | * 8/1998 | Simcoe et al. | 395/311 |
| 5,832,239 | * 11/1998 | Gavin et al. | 395/285 |
| 5,835,739 | * 11/1998 | Bell et al. | 710/128 |
| 5,838,937 | * 11/1998 | Lee et al. | 395/311 |
| 5,854,906 | * 12/1998 | Van Loo | 710/119 |
| 5,857,114 | * 1/1999 | Kim | 395/842 |
| 5,859,975 | * 1/1999 | Brewer et al. | 709/213 |
| 5,949,982 | * 9/1999 | Frankeny et al. | 710/132 |
| 6,038,630 | * 3/2000 | Foster et al. | 710/132 |

\* cited by examiner

*Primary Examiner*—Robert Beausoleil
*Assistant Examiner*—Raymond N Phan
(74) *Attorney, Agent, or Firm*—Brooks & Kushman P.C.

(57) ABSTRACT

A method and system for transmitting data among a plurality of cards in a crossbar interconnect network having a plurality of cards each having source paths and destination paths utilizes a plurality of source arbitrators and a plurality of destination arbitrators each associated with the cards. The source arbitrators generate connection request commands from the source paths requesting access to a desired destination path and broadcasts the request for receipt by all of the destination arbitrators. The destination arbitrator associated with the desired destination path captures the connection request command and processes the command based on whether or not the desired destination path is busy. If the desired destination path is not busy, the destination arbitrator generates a connection command requesting a connection be made between the source path and the desired destination path. If the desired destination path is busy, the destination arbitrator stores the connection request command in one of a plurality of buffers until the desired destination path becomes available.

36 Claims, 3 Drawing Sheets

METHOD AND SYSTEM FOR ARBITRATING PATH CONTENTION IN A CROSSBAR INTERCONNECT NETWORK

TECHNICAL FIELD

This invention relates to methods and systems for arbitrating path contention in an interconnect fabric utilizing serial or parallel crossbar switch technology.

BACKGROUND ART

Multiple cards having to communicate with each other have become widely used in computing systems. However, problems arise when the cards need to transfer data between each other and contend for communication path allocation.

In an interconnect fabric using serial or parallel crossbar switch technology, path arbitration is required when path contention occurs. For example, in a system having an NxN fully connected non-blocking crossbar, all of the cards in the system have their input paths fully connected to the crossbar. A problem arises when more than one source path needs to send data to the same destination path at the same time. A source path that is connected to a destination path may remain connected for a long period of time blocking all traffic intended for that path regardless of priority. The source path(s) end up continuously trying to gain access to the destination path until it becomes available without any assurance it will ever get connected to the desired destination path. This is referred to as a lock-out condition when one source path cannot make its connection. A fair system of arbitration would capture the connection requests and honor them in the order in which they were received.

Thus, there exists a need for path arbitration in such a system when path contention occurs, and to process high priority requests ahead of low priority requests.

DISCLOSURE OF THE INVENTION

It is a general object of the present invention to provide a method and system for allocating paths in a crossbar interconnect network.

In carrying out the above object and other objects, features, and advantages of the present invention, a method is provided for transmitting data among a plurality of cards in a crossbar interconnect network, each of the plurality of cards having source paths for originating the data and destination paths for receiving the data. The method includes the step of generating a connection request command from one of the source paths requesting access to a desired one of the destination paths. The method also includes the step of capturing the connection request command at the desired destination path. Still further, the method includes the step of processing the connection request command based on whether or not the desired destination path is busy so as to prevent a lock-out condition and to fairly allocate the desired destination path.

In further carrying out the above object and other objects, features, and advantages of the present invention, a system is also provided for carrying out the steps of the above described method. The system includes a source arbitrator associated with each of the cards and in communication with each of the source paths of the associated card for generating a connection request command from one of the source paths requesting access to a desired one of the destination paths. The system also includes a destination arbitrator associated with each of the cards for capturing the connection request command at the desired destination path and processing the request command based on whether or not the desired destination path is busy.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
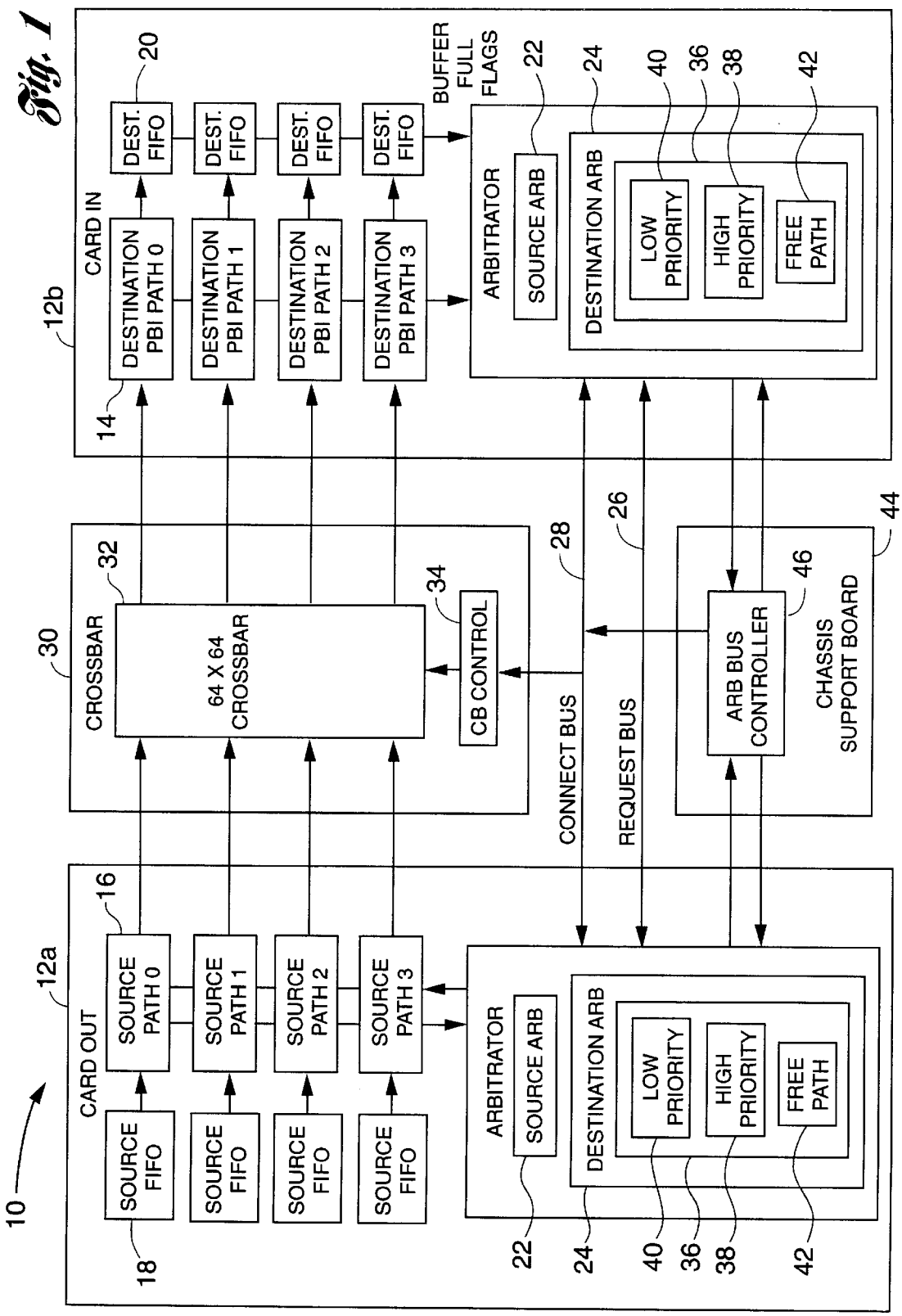
FIG. 1 is a schematic block diagram of an interconnect network.

FIG. 1 is a schematic block diagram of an interconnect network system in which the present invention may be employed, denoted generally by reference numeral 10. The system 10 includes a plurality of cards 12, two of which are shown as 12a, 12b. Each of the cards 12 have N input/destination paths 14 and M output/source paths 16 for communicating with each of the other cards. For example, the system 10 may include sixteen cards each having four inputs and four outputs. However, the number of inputs does not have to equal the number of outputs. Furthermore, for ease of illustration, only the source paths 16 are shown for card 12a while only the destination paths 14 are shown for card 12b. In actuality, card 12a would have similar destination paths 14 as card 12b, and card 12b would have similar source paths 16 as card 12a.

Each of the source paths 16 have a source buffer 18 associated therewith. Each source buffer 18 stores data and connection information for receipt by its respective source path 16. A frame of data is stored in the source buffer 18 in which the first line of the frame instructs the source path 16 what destination path the data should be sent to and what type of connection to make, i.e., high priority, low priority, or free path. A high or low priority request type is a request to talk to a specific path on the requested destination card. A free path request type is a request to talk to any available path on the requested destination card.

Similarly, each of the destination paths 14 has a destination buffer 20 associated therewith for storing the data received by its respective destination path 14 until retrieved for subsequent processing or forwarding. Preferably, source buffer 18 and destination buffer 20 each have a first-in, first-out (FIFO) queue structure.

Each card 12 also includes a source arbitrator 22 and a destination arbitrator 24. Source arbitrator 22 is in communication with each of the source paths 16 for receiving connection requests. Upon reading the frame of data stored in the source buffer 18, source path 16 determines which destination path 14 the data needs to be sent to and initiates a connection request command to the source arbitrator 22. Each connection request command is then transferred to a request bus 26 by the source arbitrator 22 to be captured by the destination arbitrator 24 responsible for the requested destination path. Preferably, each source arbitrator 22 transfers only one request to any one destination path 14 at a time. That is, if more than one source path 16 on its card wants to talk to the same destination path 14, source arbitrator 22 will transfer one request and hold the rest. Once the transferred request is completed, source arbitrator 22 will then transfer the next request to the same destination path 14. This is done so as to avoid a 64-deep FIFO buffer associated with each destination path as described in greater detail below.

Each of the destination arbitrators 24 is in communication with their associated destination paths 14 and destination buffers 20. Destination arbitrator 24 captures each of the connection request commands for the destination paths 14 on its board. If the requested destination path 14 is not in use, destination arbitrator 24 will post a connection command to a connect bus 28. Furthermore, the destination arbitrator 24 is in communication with each of the destination buffers 20 so that when any of the destination buffers 20 become almost full, destination arbitrator 24 will prevent data from being sent until instructed otherwise as described below. Upon noticing the destination buffer 20 becoming almost full, the destination arbitrator 24 sends a "buffer almost full" command across the connect bus 28 to the source arbitrator 22. The source arbitrator 22 will then instruct the source path 16 to stop sending data until a "resume command" is sent by the destination arbitrator 24 when the destination buffer 20 is no longer almost full.

Connections between source paths 16 and destination paths 14 are accomplished via a crossbar card 30. Crossbar card 30 includes a switch 32 having 16Xn inputs and 16Xm outputs (where "16" represents the number of cards in the system) capable of connecting each of the source paths 16 to one of the destination paths 14 so as to transfer data between each of the cards 12. Crossbar card 30 also includes a crossbar (CB) control 34 for monitoring the connect bus 28 and instructing the switch 32 as to which source path 16 should be connected to a particular destination path 14. It should be noted that all of the destination paths 14 can be connected at the same time if all of the source paths 16 need to send data to different destination paths. The present invention also supports broadcasting, wherein one source path 16 can send data to one or more or all destination paths 14 at one time.

If the requested destination path 14 is in use, destination arbitrator 24 puts the request in a request buffer 36 associated with the requested destination path 14. That is, even though there is only one request buffer 36 shown in FIG. 1, there is actually one request buffer 36 for each destination path 14 for each card 12. Preferably, request buffer 36 is a 16-deep first-in, first-out (FIFO) buffer. In addition, each request buffer 36 preferably includes three sets of buffers for storing three types of requests, i.e., a low priority request buffer 38, a high priority request buffer 40 and a free path request buffer 42. When the requested destination path becomes available, destination arbitrator 24 will post the connection request command stored in the request buffer 36 to the connect bus 28 for receipt by CB control 34. Since the source arbitrator 22 preferably sends at the most only one of each request type to any one destination path 14 at a time, the request buffer 36 only has to keep track of 16 requests of each type, one from each card, not 16Xn or 64 (one from each source path). However, if the request buffer 36 is 64-deep, the request buffer 36 would be able to keep track of all the possible requests from all the cards 12 so as to not only prevent lock-out, but to also make arbitration totally fair. That is, if the request buffer 36 is only 16-deep, then the source path 16 can only send one connection request command for the desired destination path, while another source path 16 on a different card 12 can send a connection request command for the desired destination path, even though earlier requests are still waiting to be connected.

A request bus 26 and a connect bus 28 interconnect each of the source arbitrators 22 with each of the destination arbitrators 24. Although a separate request bus 26 and connect bus 28 are disclosed herein, the present invention can employ a single bus supporting both types of commands if desired.

A chassis support board 44 includes an arbitrator bus controller 46 in communication with each of the source arbitrators 22 and destination arbitrators 24 for allocating the request and connect buses 26,28, respectively, to ensure only one of the arbitrators 22,24 drives the buses 26,28 at a time. That is, arbitrator bus controller 46 instructs the cards 12 when they can use the request bus 26 or the connect bus 28 after any one of the arbitrators 22,24 requests use of one of these buses.

Figure 2A:
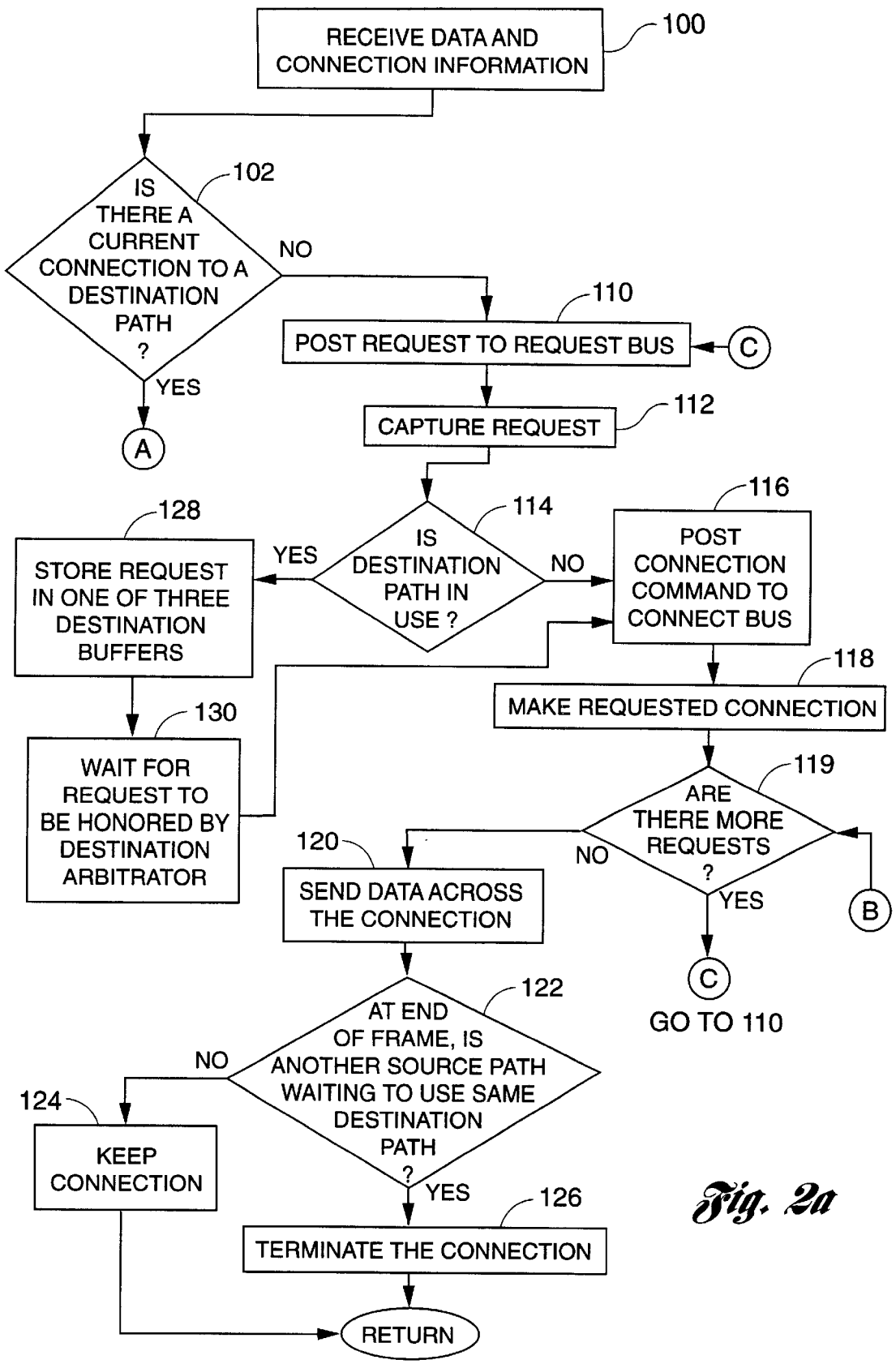
FIGS. 2a and 2b are a flow diagram illustrating the general sequence of steps associated with the present invention.
Figure 2B:
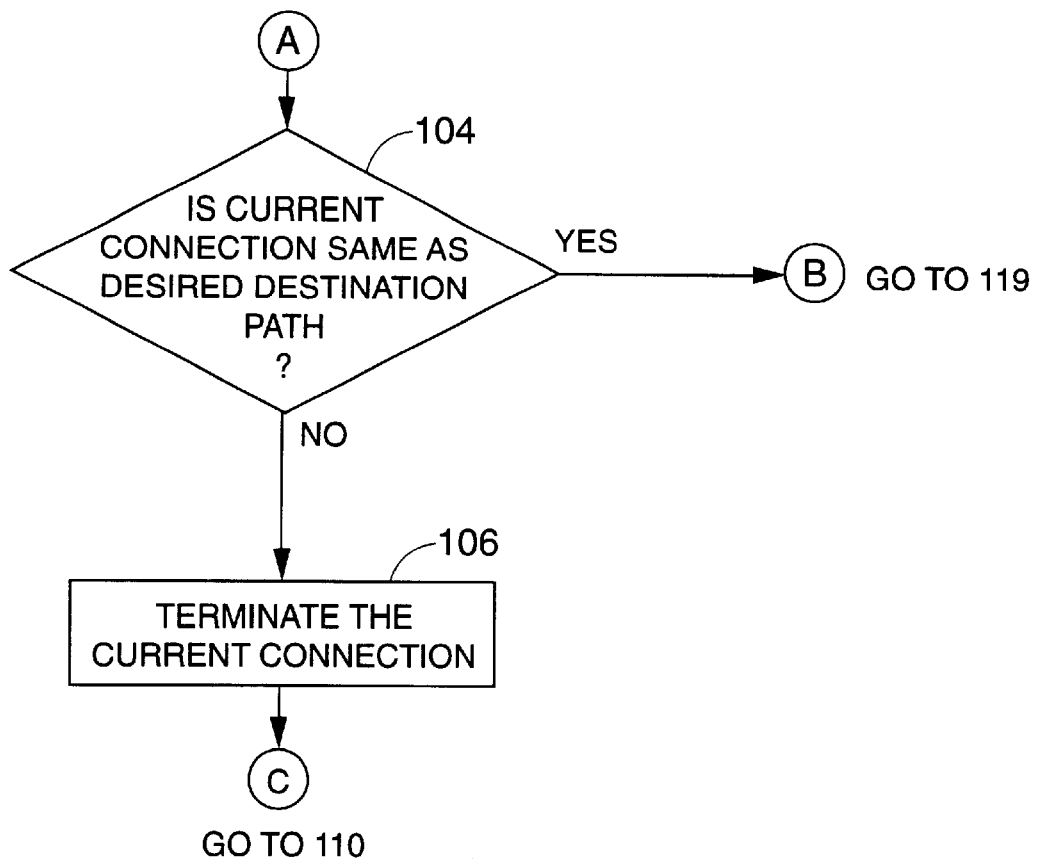

Turning now to FIGS. 2a and 2b, there is shown a flow diagram illustrating the general sequence of steps associated with the present invention. First, the source path 16 receives a frame of data and connection information from its associated source buffer 18, as shown at block 100. Next, a determination is made as to whether or not the source path 16 has a current connection to any destination path 14, as shown at conditional block 102. If not, the source arbitrator 22 posts a connection request command to the request bus 26, as shown at block 110. The destination card 12 having the requested destination path 14 captures the request, as shown at block 112.

If the destination path 14 is not in use, destination arbitrator 24 will post a connection command to the connect bus 28, as shown at conditional block 114 and block 116. The CB control 34 receives the command and instructs switch 32 to connect the source path 16 to the requested destination path 14, as shown at block 118. The source arbitrator 22, which is constantly monitoring the connect bus 28, will recognize its connection request being sent across the connect bus 28 and know when it can then start sending data.

Before sending the data, however, a determination is made as to whether or not the data needs to be sent to additional connections, as shown at conditional block 119. This is known as multi-casting wherein the source path 16 can talk to two or more destination paths 14 at once. If there are no more connection requests, the source path 16 then begins sending data across the connection, as shown at block 120. If, on the other hand, there are more connection requests, the source arbitrator 22 will return to block 110 and post another request to the request bus 26. Thus, the source path 16 will request connections one at a time until all connection are made before the data is sent at once to all the destination paths 14.

Data is broken up into frames of a maximum size. A connection between a source path 16 and a destination path 14 is typically made for one frame at a time. When an end of frame is encountered, a determination is made as to whether or not there is another path waiting to use the same destination path, as shown at conditional block 122. Again, this determination is made by the source arbitrator 22 continuously monitoring the request bus 26 to identify if any requests are made for the current destination path. If not, the end of the frame is sent with an instruction to keep the connection, block 124, so that another frame can be sent if the next frame is going to the same destination path or just to hold the connection until another source path 16 needs access to the same destination path.

However, if there is another source path 16 waiting to use the same destination path 14, an end of frame terminated (EOFT) command is sent with an instruction to terminate the connection, as shown at block 126. Thus, the destination path 14 will become available for the next request.

Returning to conditional block 102, if there is a current connection between the source path 16 and a destination path 14, as might be the case as described above at blocks 122 and 124, the method proceeds to determine if the connection is with the desired destination path, as shown at conditional block 104. If so, the source path 16 immediately proceeds to send the data, as shown at block 120. If not, the connection is terminated, and the source arbitrator 22 proceeds to post the connection request command, as shown at block 110.

Returning to conditional block 114, if the destination path is already in use, destination arbitrator 24 will store the request in the request buffer 36, as shown at block 128. As described above, destination arbitrator 24 will then store the request in one of the three buffers 36 associated with the requested destination path 14, as shown at block 128. At this point, the request is stored and waits to be honored by the destination arbitrator 24, as shown at block 130.

When the destination path 14 becomes available, destination arbitrator 24 will first check to see if there is a high priority request stored in the high priority FIFO 38. If so, the method proceeds to block 116 to make the connection. If not, the method proceeds to determine if there is a low priority request stored in the low priority request FIFO 40. If so, the method proceeds to block 116 to make the connection.

If there is neither a high priority request or a low priority request stored in request buffer 36, the method proceeds to determine if there is a free path request for the destination path 14 stored in the free path request FIFO 42. If so, the method proceeds to block 116 to make the connection. Otherwise, the request remains stored until the desired destination path becomes available.

While the best modes for carrying out the invention have been described in detail, those familiar with the art to which this invention relates will recognize various alternative designs and embodiments for practicing the invention as defined by the following claims.

What is claimed is:

1. A method for transmitting data among a plurality of cards in a crossbar interconnect network, each of the plurality of cards having source paths for originating the data and destination paths for receiving the data, the method comprising:
   generating a connection request command from one of the source paths requesting access to a desired one of the destination paths;
   capturing the connection request command at the desired destination path;
   generating a connection command from the desired destination path for connecting the one of the source paths to the desired destination path if the desired destination path is not busy;
   storing the connection request command from each of the source paths associated with each of the plurality of cards at the desired destination path if the desired destination path is busy;
   continuously monitoring the desired destination path to determine when the desired destination path is no longer busy; and
   generating a second connection command from the desired destination path based on the connection request command when the desired destination path is no longer busy.

2. The method as recited in claim 1 wherein generating the connection command further includes transmitting the data from the one of the source paths to the desired destination path.

3. The method as recited in claim 1 wherein generating the second connection command includes determining a priority of the connection request command stored in the request buffer.

4. The method as recited in claim 2 wherein the method further comprises:
   determining if any additional connection requests relating to the data exist prior to transmitting the data; and
   if so, generating corresponding connection request commands from the one of the source paths requesting access to additional destination paths.

5. The method as recited in claim 1 wherein the connection request command is stored in a first-in first-out manner.

6. The method as recited in claim 2 wherein transmitting the data includes:
   determining if the desired destination path is almost full; and
   if so, generating a pause command for receipt by the one of the source paths instructing the one of the source paths to stop transmitting the data.

7. The method as recited in claim 2 wherein transmitting the data further includes:
   determining if a second one of the source paths is requesting access to the desired destination path upon completion of transmitting the data; and
   if so, terminating the connection between the one of the source paths and the desired destination path so as to allow the second one of the source paths access to the desired destination path.

8. The method as recited in claim 6 further comprising generating a resume command for receipt by the one of the source paths when the desired destination path is no longer almost full, the resume command instructing the one of the source paths to resume transmitting the data.

9. The method as recited in claim 7 wherein the step of determining if a second one of the source paths is requesting access to the desired destination path occurs when the end of a frame of data is encountered.

10. The method as recited in claim 7 further comprising holding the connection between the one of the source paths and the desired destination path if it is determined that no other source paths are requesting access to the desired destination path.

11. A system for transmitting data among a plurality of cards in a crossbar interconnect network, each of the plurality of cards having source paths for originating the data and destination paths for receiving the data, the system comprising:
   a source arbitrator associated with each of the cards and in communication with each of the source paths of the associated card for generating a connection request command from one of the source paths requesting access to a desired destination path;
   a destination arbitrator associated with each of the cards and in communication with each of the destination paths for capturing the connection request command at the desired destination path, processing the connection request command based on whether or not the desired destination path is busy, and continuously monitoring the desired destination path to determine when the desired destination path is no longer busy; and
   a plurality of request buffers corresponding to each of the destination paths, wherein the destination arbitrator, in processing the connection request command, stores the connection request command in the request buffer corresponding to the desired destination path if the desired destination path is busy.

12. The system as recited in claim 11 further comprising a switch in communication with each of the destination arbitrators and wherein the destination arbitrator, in processing the connection request command, is further operative to generate a connection command for receipt by the switch if the desired destination path is not busy, and wherein the switch connects the one of the source paths to the desired destination path in response to the connection command so as to allow the one of the source paths to transmit the data.

13. The system as recited in claim 11 wherein each of the request buffers has a depth large enough to store the connection request commands from each of the source paths associated with each of the plurality of cards so as to fairly allocate the desired destination path.

14. The system as recited in claim 11 wherein the destination arbitrator, in continuously monitoring the desired destination path, is further operative to generate a second connection command based on the connection request command stored in the request buffer associated with the desired destination path when the desired destination path is no longer busy.

15. The system as recited in claim 11 wherein each of the request buffers is a first-in first-out buffer.

16. The system as recited in claim 12 wherein the source arbitrator generates additional connection request commands from the one of the source paths requesting access to additional desired destination paths prior to transmitting the data.

17. The system as recited in claim 12 further comprising a destination buffer corresponding to each of the destination paths and wherein the destination arbitrator is further operative to determine if the destination buffer associated with the desired destination path is almost full and, if so, generate a pause command for receipt by the one of the source paths instructing the one of the source paths to stop transmitting the data.

18. The system as recited in claim 14 wherein the destination arbitrator, in generating the second connection command is further operative to determine a priority of the connection request command stored in the request buffer associated with the desired destination path.

19. The system as recited in claim 12 wherein the source arbitrator is further operative to determine if a second one of the source paths is requesting access to the desired destination path after transmission of the data and to generate a connection termination command if a second one of the source paths is requesting access to the desired destination path.

20. The system as recited in claim 17 wherein the destination arbitrator is further operative to generate a pause command for receipt by the one of the source paths when the destination buffer is no longer almost full, the resume command instructing the one of the source paths to resume transmitting the data.

21. The system as recited in claim 18 wherein each of the request buffers include a high priority request buffer for storing high priority requests.

22. The system as recited in claim 18 wherein each of the request buffers include a low priority request buffer for storing low priority requests.

23. The system as recited in claim 18 wherein each of the request buffers include a free path request buffer for storing free path requests requesting access to any available destination path on a particular card.

24. A scaleable apparatus for transmitting data among a plurality of cards in a crossbar interconnect network, each of the plurality of cards having source paths for originating the data and destination paths for receiving the data, the apparatus comprising:

each of the cards including a source arbitrator in communication with each of the source paths and a destination arbitrator in communication with each of the destination paths, each of the destination arbitrators including a request buffer for each of the destination paths, the source arbitrators generating a connection request command for each of the source paths requesting access to a desired one of the destination paths, and the destination arbitrators capturing the connection request commands directed to any of the destination paths associated with its respective card, storing the connection request commands in the request buffer associated with the desired destination path if the desired destination path is busy, continuously monitoring the desired destination path to determine when the desired destination path is no longer busy, and generating connection commands when the desired destination path is not busy so that data may be transmitted;

a communication bus coupling each of the source arbitrators with each of the destination arbitrators, the communication bus for receiving the connection request commands from each of the source arbitrators and broadcasting the connection request commands for receipt by each of the destination arbitrators and for receiving and broadcasting the connection commands from each of the destination arbitrators; and a switch connected to each of the source paths and each of the destination paths and the communication bus for connecting each of the source paths with a corresponding desired destination path upon receipt of a corresponding connection command.

25. The apparatus as recited in claim 24 wherein the communication bus includes:

a request bus for receiving and broadcasting the connection request commands; and a connect bus for receiving and broadcasting the connection commands.

26. The apparatus as recited in claim 24 further comprising:

an arbitration bus controller coupled to each of the source arbitrators and each of the destination arbitrators for determining when each of the source arbitrators and each of the destination arbitrators may transmit a connection request command and a connection command, respectively.

27. The apparatus as recited in claim 24 wherein each of the request buffers has a depth large enough to store the connection request commands from each of the source paths associated with each of the plurality of cards so as to fairly allocate the desired destination path.

28. The apparatus as recited in claim 24 wherein each of the request buffers include priority buffers to determine a priority of the stored connection command associated with the desired destination buffer.

29. The apparatus as recited in claim 24 wherein the source arbitrators generate additional connection request commands for each of the source paths requesting access to additional destination paths prior to transmitting the data.

30. The apparatus as recited in claim 24 wherein each of the destination paths include a destination buffer and wherein each of the destination arbitrators are operative to determine if the destination buffer associated with the desired destination path is almost full and, if so, generate a pause command by receipt by the source path transmitting the data instructing the source path to stop transmitting data.

31. The apparatus as recited in claim 24 wherein each of the source arbitrators is further operative to determine if another one of the source paths is requesting access to the desired destination path based on the connection request commands broadcast by the communication bus and, if so, to generate a connection termination command after transmitting the data.

32. The apparatus as recited in claim 28 wherein the priority buffers include a high priority request buffer for storing high priority requests.

33. The apparatus as recited in claim 28 wherein the priority buffers include a low priority request buffer for storing low priority requests.

34. The apparatus as recited in claim 28 wherein the priority buffers include a free path request buffer for storing free path requests requesting access to any available destination path.

35. The apparatus as recited in claim 28 wherein each of the request buffers is a first-in first-out buffer.

36. The apparatus as recited in claim 30 wherein each of the destination arbitrators are further operative to transmit a resume command to the source path upon the destination buffer no longer being almost full.

* * * * *